(12) United States Patent
Reich et al.

(10) Patent No.: US 7,905,110 B2
(45) Date of Patent: Mar. 15, 2011

(54) THERMAL ENERGY MODULE

(76) Inventors: Daniel Reich, Tucson, AZ (US);
Michael Burdett, Tucson, AZ (US);
Vladimir Reich, Tucson, AZ (US)

(*) Notice: Subject to any disclaimer, the term of this patent is extended or adjusted under 35 U.S.C. 154(b) by 50 days.

(21) Appl. No.: 12/384,365

(22) Filed: Apr. 2, 2009

(65) Prior Publication Data
US 2010/0252232 A1 Oct. 7, 2010

(51) Int. Cl.
*F25D 16/00* (2006.01)

(52) U.S. Cl. ............... 62/434; 62/435; 62/430; 165/10; 126/400

(58) Field of Classification Search ............ 165/10, 165/907; 62/430, 59; 126/400
See application file for complete search history.

(56) References Cited

U.S. PATENT DOCUMENTS

| | | | | |
|---|---|---|---|---|
| 2,156,544 A * | 5/1939 | Raskin | | 62/430 |
| 2,538,016 A * | 1/1951 | Kleist | | 62/139 |
| 2,764,876 A * | 10/1956 | Parcaro | | 62/324.1 |
| 4,609,036 A | 9/1986 | Schrader | | |
| 4,735,064 A | 4/1988 | Fisher | | |
| 4,827,735 A * | 5/1989 | Foley | | 62/430 |
| 5,143,148 A * | 9/1992 | Merryfull | | 165/10 |
| 5,687,706 A * | 11/1997 | Goswami et al. | | 126/263.01 |
| 5,871,041 A * | 2/1999 | Rafalovich et al. | | 165/10 |
| 5,944,089 A * | 8/1999 | Roland | | 165/10 |
| 6,062,035 A * | 5/2000 | Ueno | | 62/324.1 |
| 6,079,481 A * | 6/2000 | Lowenstein et al. | | 165/10 |
| 6,158,499 A * | 12/2000 | Rhodes et al. | | 165/10 |
| 6,216,469 B1 * | 4/2001 | Miller | | 62/59 |
| 6,247,522 B1 * | 6/2001 | Kaplan et al. | | 165/10 |
| 6,253,567 B1 * | 7/2001 | Imanari et al. | | 62/434 |
| 6,481,216 B2 * | 11/2002 | Simmons et al. | | 62/6 |
| 6,604,573 B2 * | 8/2003 | Morishima et al. | | 165/153 |
| 6,959,758 B2 * | 11/2005 | Hughes et al. | | 165/165 |
| 7,363,772 B2 | 4/2008 | Narayanamurthy | | |
| 7,441,558 B2 | 10/2008 | Leifer et al. | | |
| 7,503,185 B2 * | 3/2009 | Narayanamurthy et al. | ... | 62/332 |
| 2003/0014987 A1 * | 1/2003 | Levenduski et al. | | 62/185 |
| 2008/0034760 A1 * | 2/2008 | Narayanamurthy et al. | ..... | 62/59 |
| 2008/0141703 A1 * | 6/2008 | Bean, Jr. | | 62/434 |

* cited by examiner

*Primary Examiner* — Allen J Flanigan

(57) ABSTRACT

The invention comprises a Thermal Energy Module comprising a tank adapted to hold water or other heat transfer medium (such as water), a water loop for introducing the heat transfer medium and removing the heat transfer medium, and a refrigeration loop comprising a heat exchanger further comprised of an inlet manifold, a heat transfer structure (such as a micro channel or pipe-in-plate panel) and an outlet manifold wherein the heat exchanger is adapted to transfer thermal energy between the heat transfer structure and the heat transfer medium. The Thermal energy Module may be utilized as a component of a heating and cooling system. Such a Thermal Energy Module may be used to store thermal energy during the day and return it during the evening. Additionally, such a Thermal Energy Module may be implemented as an array of such modules and such array of modules may be adapted to fit within the walls of a building or structure.

11 Claims, 10 Drawing Sheets

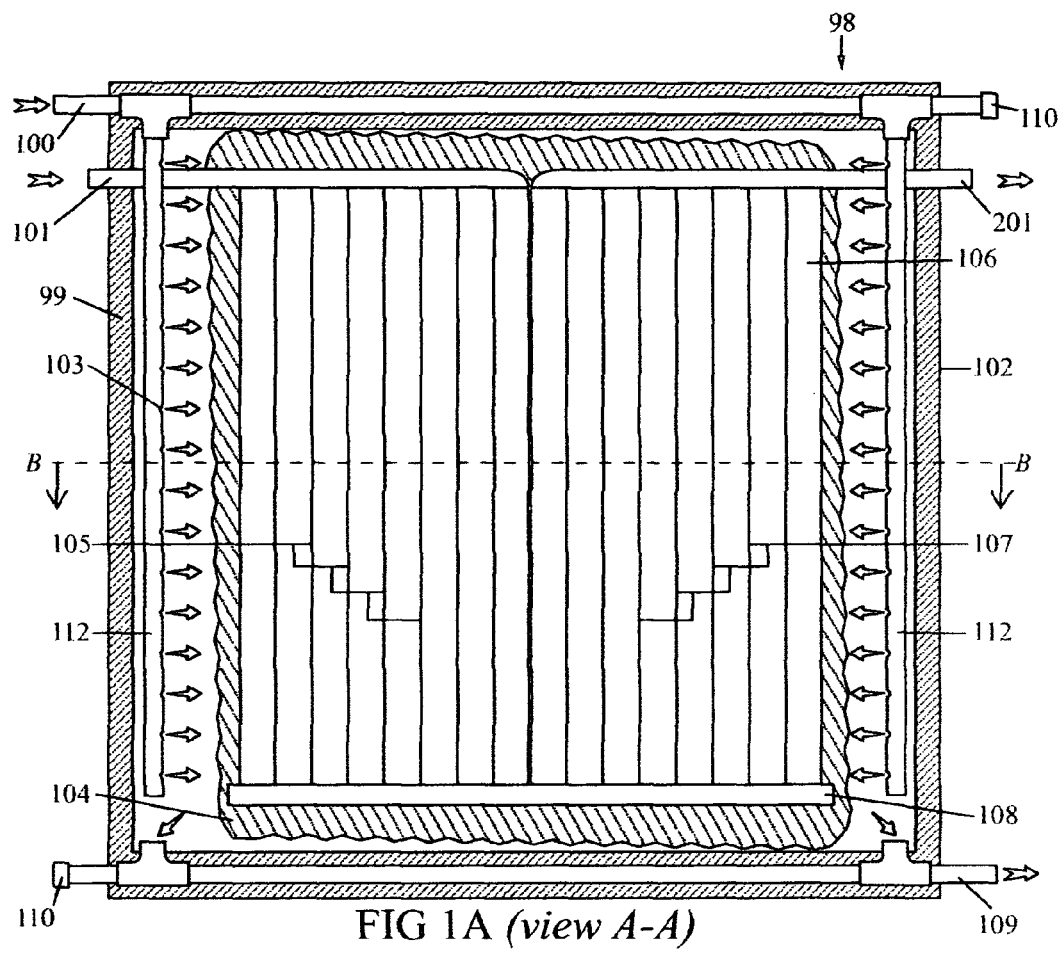
FIG 1A (view A-A)
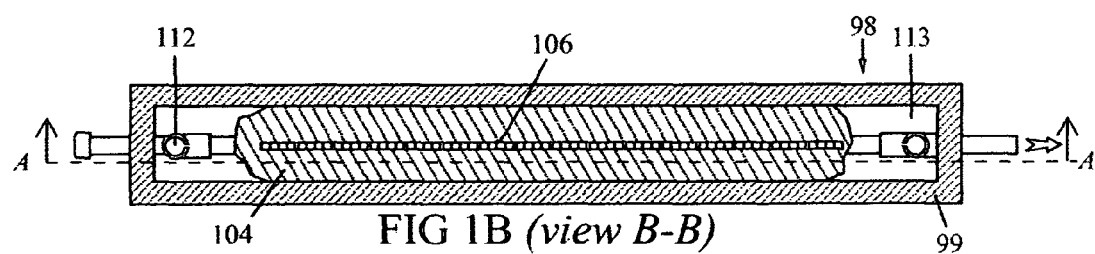
FIG 1B (view B-B)
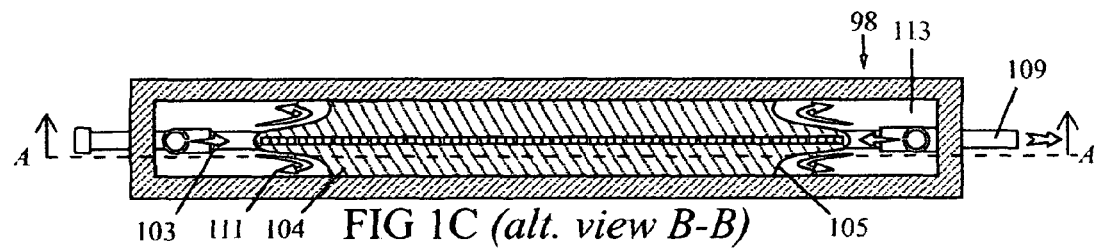
FIG 1C (alt. view B-B)

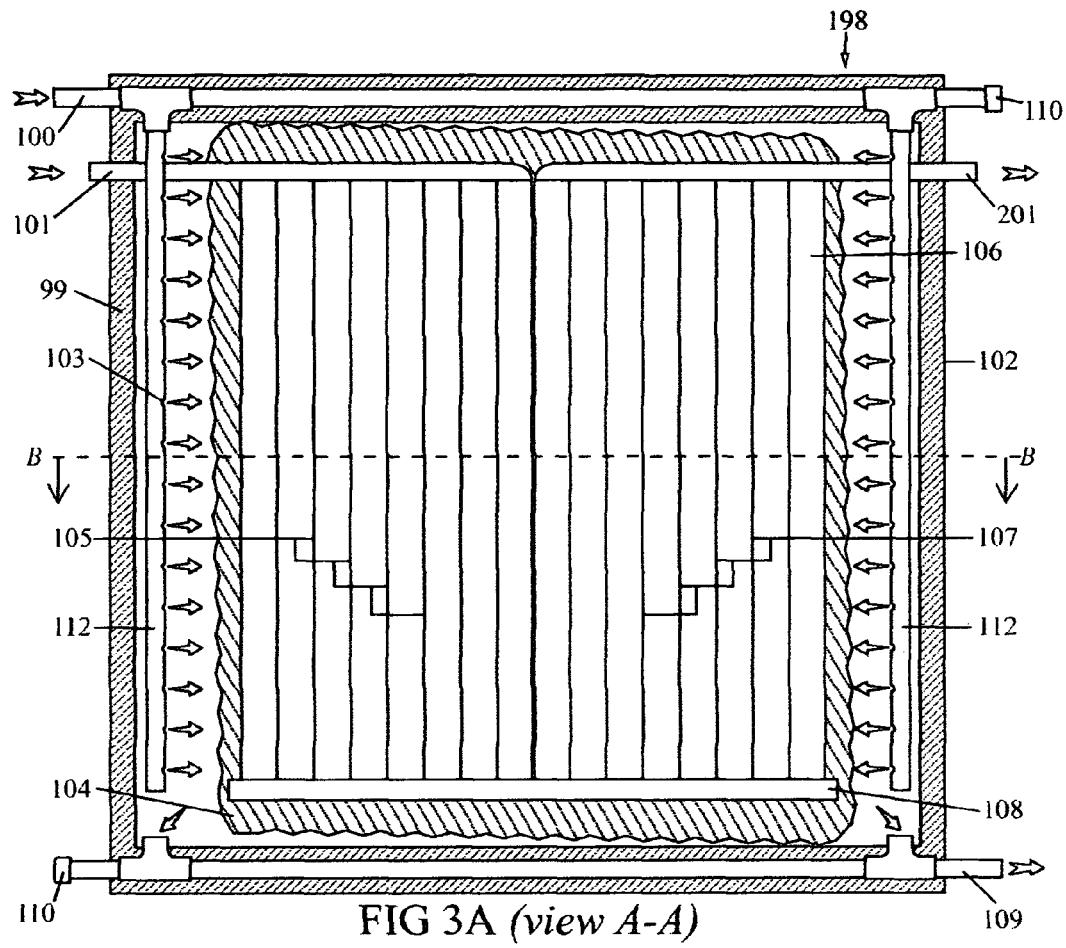
FIG 3A (view A-A)
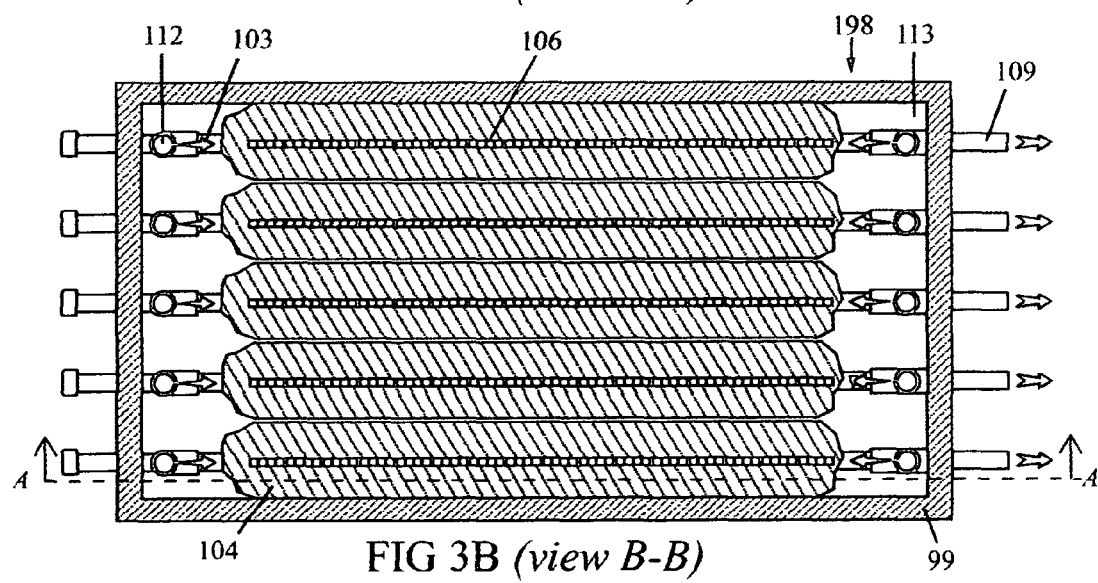
FIG 3B (view B-B)

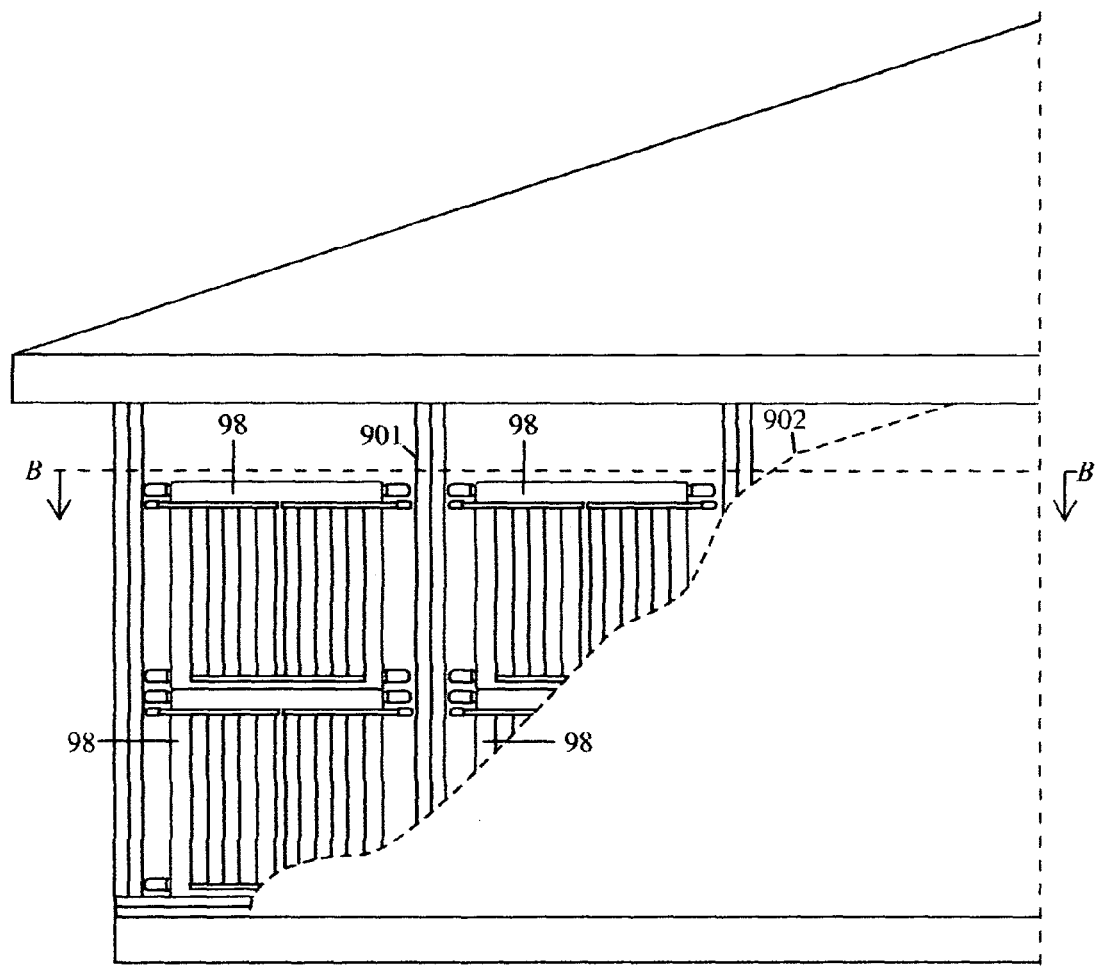
FIG 9A *(view A-A)*
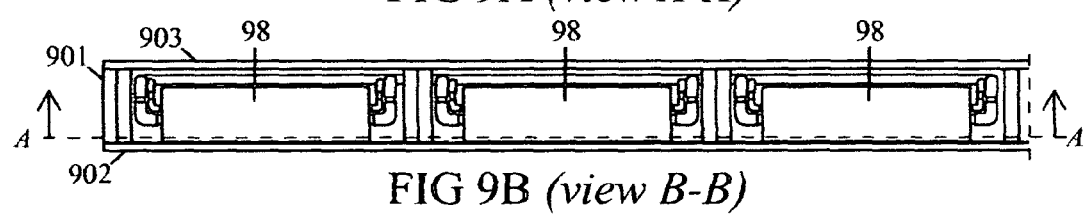
FIG 9B *(view B-B)*

THERMAL ENERGY MODULE

BACKGROUND OF THE INVENTION

1. Field of the Invention

The present invention relates to cold and hot thermal energy storage systems as well as using such systems to optimize and reduce the electric and natural gas energy consumption of a building.

2. Description of the Prior Art

Improving the energy efficiency of building comfort systems has become progressively more important due to rising energy costs as well as increased awareness and concern over global warming as a result of humanity's rising consumption of carbon fuels for electrical energy generation, direct burn heating, and domestic hot water appliances. One area where these concerns can be addressed is through leveling demand by shifting some of the load during peak hours of a day to off-peak times, thereby eliminating the need to build and run expensive peak generator turbines. These turbines are costly to build, install and operate and are typically used for only a very limited number of hours during the hottest days of the year. This invention addresses these concerns by increasing the efficiency of building comfort systems and helping to control electricity demand while increasing the general comfort level in the installed facilities.

Demand control and increased efficiency is primarily accomplished by shifting the burden of cooling from the hottest time of the day to the night when ambient temperatures as well as demand are considerably lower. Refrigeration equipment efficiency increases when the temperature lift requirement decreases. The difference in temperature lift between a hot day and a cool night can often be as high as 50%, thereby resulting in a massive drop in refrigeration equipment lift requirements and a corresponding efficiency increase. The problem is typically this equipment is required to operate during the day, due to the lack of cost-effective, efficient energy storage. And worse yet, the resulting demand in electricity consumption peaks requiring the use of low-efficiency gas turbine peak generators. The efficiency of these generators are generally 40-50% lower than good steam turbines which generate most of our electricity. Reducing or eliminating these peaks can be accomplished by storing energy for later use, and is the basic principle of Thermal Energy Storage (TES) technology. By storing cold water or ice during off-peak "cool hours" and then using this thermal energy to cool a facility during peak times will considerably reduced power consumption from the grid as well as helping to balance generating loads over a 24-hour period. In the same respect, hot water can also be generated during the daytime using, for example, solar and stored for later use in domestic hot water or nighttime heating.

While there are different types of thermal storage systems on the market the most common designs are based on cold water or two-phase ice/water storage. In recent years the ice storage systems have increased in popularity due to a considerably higher energy storage density. Currently ice storage systems are commonly used in large buildings and campuses. Such systems will generally contain chillers which cool a secondary heat transfer media such as brine to temperatures lower than water freezing temperatures. The brine circulates through tubes in ice storage tanks and cools water thereby generating ice. These systems are very complex, bulky, expensive and difficult to scale down for use in small commercial buildings or residential applications.

More recently a different approach to ice storage systems design was introduced. These systems generate ice through direct expansion of the refrigerant in a coil submerged in a tank of water. When it is time to use the accumulated cold energy the coil serves as a condenser in a secondary refrigerant loop where it condenses the refrigerant evaporated in an air conditioning unit coil. These types of systems are better suited for smaller buildings but they too suffer from being too complex, expensive and bulky for small businesses and homes. Moreover, such systems do not provide a high level of comfort due to their inherent deficiency of controlling temperature by cycling the system on and off. Also, these direct expansion systems can be used only for cooling purposes and are very difficult or impossible to combine with solar heating solutions which are becoming increasingly more important in energy conservation strategies.

SUMMARY OF THE INVENTION

The present invention overcomes the disadvantages and limitations of the prior arts by providing a means of storage for not only cold, but also hot water energy which can be generated by solar heaters. Another advantage is that the proposed design is capable of a very high level of energy efficiency by retaining the extracted heat energy and reusing it for heating or hot water use, rather than dissipating this energy from the premises into the atmosphere as in most prior arts. The system is also capable of providing a considerably higher level of comfort over previous designs by gradually modulating the cooling and heating capacity and maintaining accurate temperature set points.

The main part of the invention is the Thermal Energy Module (TEM) comprising of an insulated flat tank with a flat heat exchanger located inside. The heat exchanger is comprised of two manifolds at the top and one at the bottom of the tank connected to a micro channel or pipe-in-plate panel which allows refrigerant liquid and vapor to move from the inlet manifold through the plates or channel down to the bottom manifold and then back up to the outlet manifold. The heat exchanger is located at the center section of the tank and its width is designed to prevent the water on the both sides of the tank from freezing during the ice generating process thereby providing pockets of unfrozen water where water jet generating inlet pipes are located. Both water jet pipes are connected to a manifold located at the top of the tank. The bottom of the tank contains a water outlet manifold. The heat exchanger also can be located in the tank in a way that its manifolds are located on the sides and the refrigerant is flowing horizontally. Top and bottom water manifolds are located inside insulation to prevent the water from freezing. Instead of water, other two-phase liquids can be used in this invention. The total thickness of the TEM tank can be made shallow enough to enable its incorporation inside wall framing of a typical building. Multiple TEMs can be built in array(s) in a wall or walls simultaneously serving as wall insulation. TEMs in an array can simultaneously work in different modes at any moment in time.

Various other purposes and advantages of the invention will become clear from its description in the specification that follows and from the novel features particularly pointed out in the appended claims. Therefore, this invention comprises the features hereinafter illustrated in the drawings, fully described in the detailed description of the preferred embodiments, and particularly pointed out in the claims. However, such drawings and description, as well as this Summary of the Invention, disclose just a few of the various ways in which the invention may be practiced and are not limiting on the invention.

BRIEF DESCRIPTION OF THE DRAWINGS

FIG. 1A is an illustration of a cross section of an embodiment of the Thermal Energy Module in ice formation and in ice harvesting mode.

FIG. 1B is an illustration of the horizontal cross section of the Thermal Energy Module of FIG. 1A in ice formation mode.

FIG. 1C is an illustration of the horizontal cross section of FIG. 1B in cold harvesting mode.

FIG. 3A is an illustration of an array embodiment of a plurality of Thermal Energy Modules of FIG. 1A.

FIG. 3B is an illustration of the array embodiment of FIG. 3A showing ice growth among parallel heat exchangers.

FIG. 9 is an illustration of the application of a Thermal Energy Module within the wall framing of a building.

DESCRIPTION OF THE INVENTION

Figure 2:
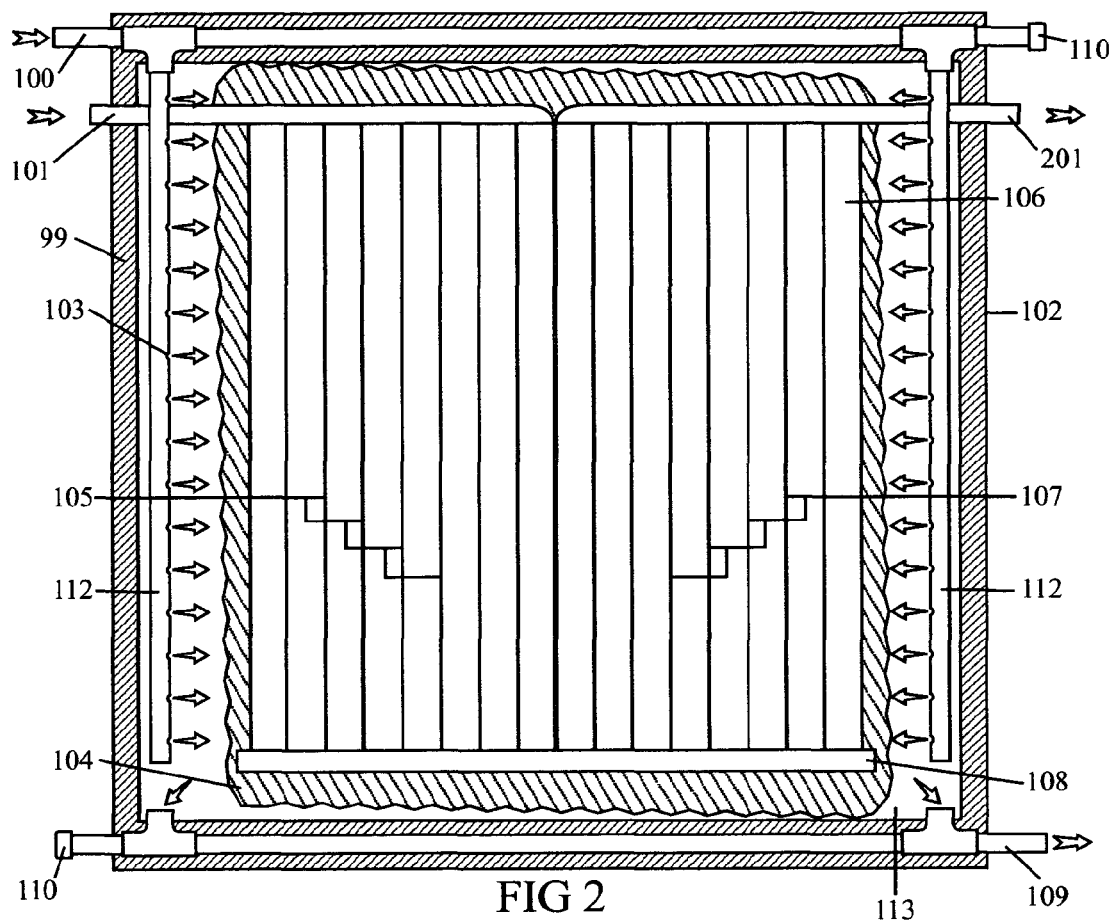
FIG. 2 is an illustration of the Thermal Energy Module of FIG. 1A configured to work in condenser mode.

The present invention is a means of storage for cold water (or similar energy transfer medium), ice, or hot water which may be generated by solar heaters wherein the means of storage allows for the ability to control demand and achieves a high level of energy efficiency by retaining extracted heat energy and reusing it for heating or generating hot water.

The present invention is a Thermal Energy Module comprising a tank and a flat heat exchanger. The heat exchanger is comprised of an intake manifold, a pass-through manifold, and an outlet manifold connected via micro-channel, pipe-in-plate panel, or similar thermal energy transfer structures which allow refrigerant liquid and vapor to move from the inlet manifold though a first energy transfer structure to the pass-through manifold and then through a second energy transfer structure to the outlet manifold. The heat exchanger is located within a tank and its size relative to the tank is designed to prevent ice from forming within a pocket or channel on at least one side of the tank during the ice generating process thereby providing a non-freezing space wherein water inlet pipes are located. These water inlet pipes are connected to a water inlet manifold. The Thermal Energy Module also includes a water outlet manifold tasked with collecting water that has been introduced into the tank via the water inlet manifold and water inlet pipes. Alternatively, the non-freezing space may comprise an insulating material to prevent the water within the water inlet manifold, the water outlet manifold and the water inlet pipes from freezing. In alternate embodiments of the invention, other thermal transfer liquids may be utilized instead of water.

The total thickness of the Thermal Energy Module tank can be made shallow enough to enable its incorporation inside wall framing of a typical building. Multiple Thermal Energy Modules can be built in an array in a wall or walls and simultaneously serve as wall insulation. Different Thermal Energy Modules within an array can simultaneously work in different modes at any moment in time, i.e., some of the Thermal Energy Modules may be generating cold water or ice while other Thermal Energy Modules are storing heat, possibly even the heat generated from the process of generating the cold water or ice.

Referring to figures, wherein like parts are designated with like reference numerals and symbols, FIG. 1A is an illustration of a cross section of an embodiment of the Thermal Energy Module 98 in ice formation and in ice harvesting mode comprising a relatively flat, thermally insulated tank 102 filled with water, ice, or similar heat transfer medium such as an alternate two-phase substance. A heat exchanger 106 comprising a first energy transfer structure 105 and a second energy transfer structure 107 is located within the tank 102. The heat exchanger 106 includes an first manifold 101 and a second manifold 201 which may be connected in series with an external vapor-compression refrigeration loop (not shown) and may be utilized as either as an evaporator or a condenser. In this embodiment of the invention, the first manifold 101 is connected to a pass-through manifold 108 via a first energy transfer structure 105 such as a micro-channel or pipe-in-plate panel and the pass-through manifold 108 is connected to the second manifold 201 via a second energy transfer structure 107. Alternatively, the invention may be practiced by omitting the pass-through manifold 108 and connective the first manifold 101 to the second manifold 201 via a single energy transfer structure 105.

As indicated, the energy transfer structure 105 may comprise an aluminum microchannel extrusion or similar structure. The function of the first manifold 101 and the second manifold 201 are interchangeable. In other words, the flow of refrigerant through the heat exchanger 106 may be from the first manifold 101 to the second manifold 201 or vice-versa. During this process the refrigerant exchanges heat with water, cooling it or converting it into ice when it functions as an evaporator, or heating water when it functions as a condenser.

One or more water inlet pipes 112 are also located within the tank 102. These water inlet pipes have nozzles 103 tasked with introducing water or similar material into the portion of the tank 102 occupied by the heat exchanger 106. In this embodiment of the invention, the water inlet pipes 112 are located in pockets of water where ice is not allowed to form. These water inlet pipes 112 are connected to a water inlet manifold 100 which can, in turn, be connected to an external water system (not shown) through connectors on the end(s). The tank 102 also contains a water outlet manifold 109 with connectors on the end(s) that collects water from the tank 102. In this embodiment of the invention, the water inlet manifold 100 and the water outlet manifold 109 are located inside the tank walls 99. In this application of the invention, it is advantageous that the tank walls 99 be thermally insulated to prevent the water inlet manifold 100 and the water outlet manifold 109 from freezing during the ice formation process as well as minimizing the heat exchange (energy loss) of the water with the outside environment. The water inlet manifold 100 and the water outlet manifold 109 may include caps 110 when only one external water loop is connected to the Thermal Energy Module.

FIG. 1B is an illustration of the horizontal cross section BB of the Thermal Energy Module for FIG. 1A in ice formation mode. In this embodiment of the invention, the simple shape of the heat exchanger (a uniform plate with a relatively constant temperature across the flat areas) makes the ice formation process relatively simple, predictable and susceptible to mathematical analysis, and as a result can be easily controllable. This figure shows the state of the Thermal Energy Module when the ice 104 reaches the tank walls 99. The formation of the ice on the flanges of the heat exchanger is much slower than in the direction perpendicular to the flat plan of the heat exchanger thereby preventing the freezing of the inlet water pipes 112.

FIG. 1C is an illustration of the horizontal cross section of FIG. 1B in cold harvesting mode. Water jets formed by nozzles 103 create water turbulence 111 which facilitates thawing of the ice 105 and mixing water before exiting through the water outlet manifold 109.

FIG. 2 is an illustration of the Thermal Energy Module of FIG. 1A configured to work in condenser mode. The heat exchanger 106 is connected to an external liquid-vapor loop (not shown) as a condenser. Hot gas from a compressor (not shown) flows into the heat exchanger 106 through the first manifold 101 and is cooled by the surrounding water 113 and condensed into liquid which exits through the second manifold 201. Cold water enters the Thermal Energy Module 98 through the water inlet manifold 100, the water inlet pipes 112, and the nozzles 103 which generate water jets washing over the heat exchanger 106. The warm water leaves the Thermal Energy Module through the outlet manifold 109.

While the Thermal Energy Module is in ice generation mode, the tank 102 is filled with water 113 and the water supply (via the water inlet manifold 100) is shut off. The first manifold 101 of the heat exchanger 106 is connected to an external refrigeration system (not shown) through an expansion device. Liquid refrigerant is injected into the heat exchanger 106 and, during expansion, it partly evaporates into a mixture of liquid and vapor and which reduces its temperature. In this embodiment of the invention, the desired temperature is one below the freezing point of water 113 and ice formation begins. As the ice 104 thickness increases so does the thermal insulation between the heat exchanger 106 and water 113, thereby reducing the heat transfer from water to the refrigerant. As a result, refrigerant pressure and temperature decreases which effectively sustains the ice growth. A control system (not shown) measures the pressure/temperature of the refrigerant and calculates the thickness of the ice.

A sample algorithm for this calculation is as follows:

The controller calculates the integral starting from the moment when ice accumulation begins: $I(t)=\int Tr(\tau)^* d\tau$ where Tr is the refrigerant saturation temperature changing with time t. The thickness of the ice on one side of the heat exchanger can be calculated using the following formula: $X=\sqrt{(2^*I^*K^*Ui/\rho i/ci)}$ where Ui is the thermal conductance of ice $\rho i$ is the density of the ice Ci is the latent heat of the ice K is a correction coefficient associated with the type of the heat exchanger (derived experimentally).

When the X value reaches the value of the distance from the horizontal plane of the heat exchanger 106 from the tank wall 99, the ice formation process can be suspended. In this embodiment of the invention, the growth of ice on non-planar sides of the heat exchanger is much slower than in the direction perpendicular to its planar surface. This allows retaining pockets of unfrozen water where the water inlet pipes 112 are located. Additionally, these pockets of water prevent the buildup of pressure inside the ice to levels that could damage the heat exchanger and/or tank integrity.

When used as a water cooler, the first manifold 101 of the heat exchanger 106 of the Thermal Energy Module 98 is connected to an external refrigeration system (not shown) through an expansion device (not shown). An external water inlet valve (not shown) is opened allowing water to enter the Thermal Energy Module 98 via the water inlet manifold 100. Jets of water wash over the heat exchanger 106 thereby transferring heat from the water 113 to the refrigerant (not shown) located within the heat exchanger. Cooled water exits through the water outlet manifold 109. A controller (not shown) measures the temperature of the water leaving the water outlet manifold 109 and controls the refrigerant flow to keep the temperature of the water 113 within the tank 102 above its freezing point to prevent ice formation.

A Thermal Energy Module 98 in water cooler mode can work in parallel with one or more other Thermal Energy Modules (not shown) working in ice formation mode. In such an embodiment, when water in the first Thermal Energy Module drops to a low set point the refrigerant flow to its heat exchanger 106 is suspended and the refrigerant flow to ice generating Thermal Energy Modules is turned on. The ice generation proceeds until the temperature measured in the outlet pipe of the first Thermal Energy Module rises to a high set point at which time the refrigerant flow is returned to the first Thermal Energy Module. This sequence can go on until the ice reaches the desired thickness or the requirement for cooling ends. One of the advantages of this mode of operation is that the compressor in the refrigeration system works with reduced cycling which increases the efficiency of the system.

When operating in the harvesting cold mode, the flow of refrigerant to the Thermal Energy Module heat exchanger 106 is turned off. The water inlet valve 100 is opened and water jets start thawing the ice and cooling the water 113. The cooled water exits through the water outlet manifold.

When operating in hot water storage mode, the flow of refrigerant to the Thermal Energy Module heat exchanger 106 is turned off. The water inlet manifold 100 and the water outlet manifold 109 is connected in series with an external hot water source (not shown) such as a solar panel. The secondary loop to the Thermal Energy Module is capped 110. Hot water is circulated through the Thermal Energy Module gradually raising its temperature. When the temperature is raised to the temperature of the external hot water source, or it reaches a high temperature set point, water flow is interrupted.

It is interesting to note that Thermal Energy Modules in hot storage mode can work in tandem with Thermal Energy Modules in ice formation mode. Such a system is capable of providing cooling during the day and heating during the night.

In hot water energy harvesting mode, the flow of refrigerant to the Thermal Energy Module heat exchanger 106 is turned off. The water inlet manifold 100 and the water outlet manifold 109 are connected in series to an external hot water source (not shown) such as a solar panel creating a primary loop. These manifolds are also connected in series with an external heat sink (not shown) such as the water coil of an air conditioning unit creating a secondary loop. The flow through the secondary loop is regulated to provide adequate heating input to an air-conditioning unit or similar device. Both loops can work simultaneously enabling the Thermal Energy Module to act as a buffer as well as thermal energy storage. Alternatively, the primary loop can be shut off.

While operating as a water source condenser, the refrigerant inlet manifold 101 and the refrigerant outlet manifold 201 are connected in series to an external refrigeration loop (not shown) after a compressor comprised within the refrigeration loop. Water manifolds 100 and 109 are also connected in series to a loop with a heat sink such as a cold water supply.

Hot, compressed refrigerant transfers heat to the water loop while simultaneously being condensed within the heat exchanger 106. The heat transferred to the water loop can be used as preheat for a domestic hot water supply or as a heat source for space heating in forced air or radiant floors systems.

The Thermal Energy Module 98 may also be used in a Direct Expansion cooling system. In such an embodiment, the refrigerant loop of an external water cooled condenser (not shown) is connected in series after the external air cooled condenser (not shown). The refrigerant loop of the Thermal Energy Module is connected in parallel with the Direct Expansion coil of the air conditioning unit. An external water pump (not shown) circulates water between the TEM and the water loop of the heat exchanger. Expansion valves turn on and control the evaporation in the TEM or in the AC unit's heat exchanger. During off-peak hours the AC unit cools the space to the set point and when the set point is reached the cooling is switched to the TEM. Ice accumulation then begins. During peak hours the water pump is turned on circulating cold water through the water-source condenser. As a result refrigerant is condensed at a considerably lower temperature than that of air-source condensers. This process increases energy efficiency of the system and reduces demand.

FIG. 3A is an illustration of an Thermal Energy Module Array 198 utilizing a plurality of heat exchangers 106 within a single tank 102. FIG. 3B is an illustration of the embodiment of FIG. 3A showing ice growth among parallel heat exchangers 106.

Figure 4:
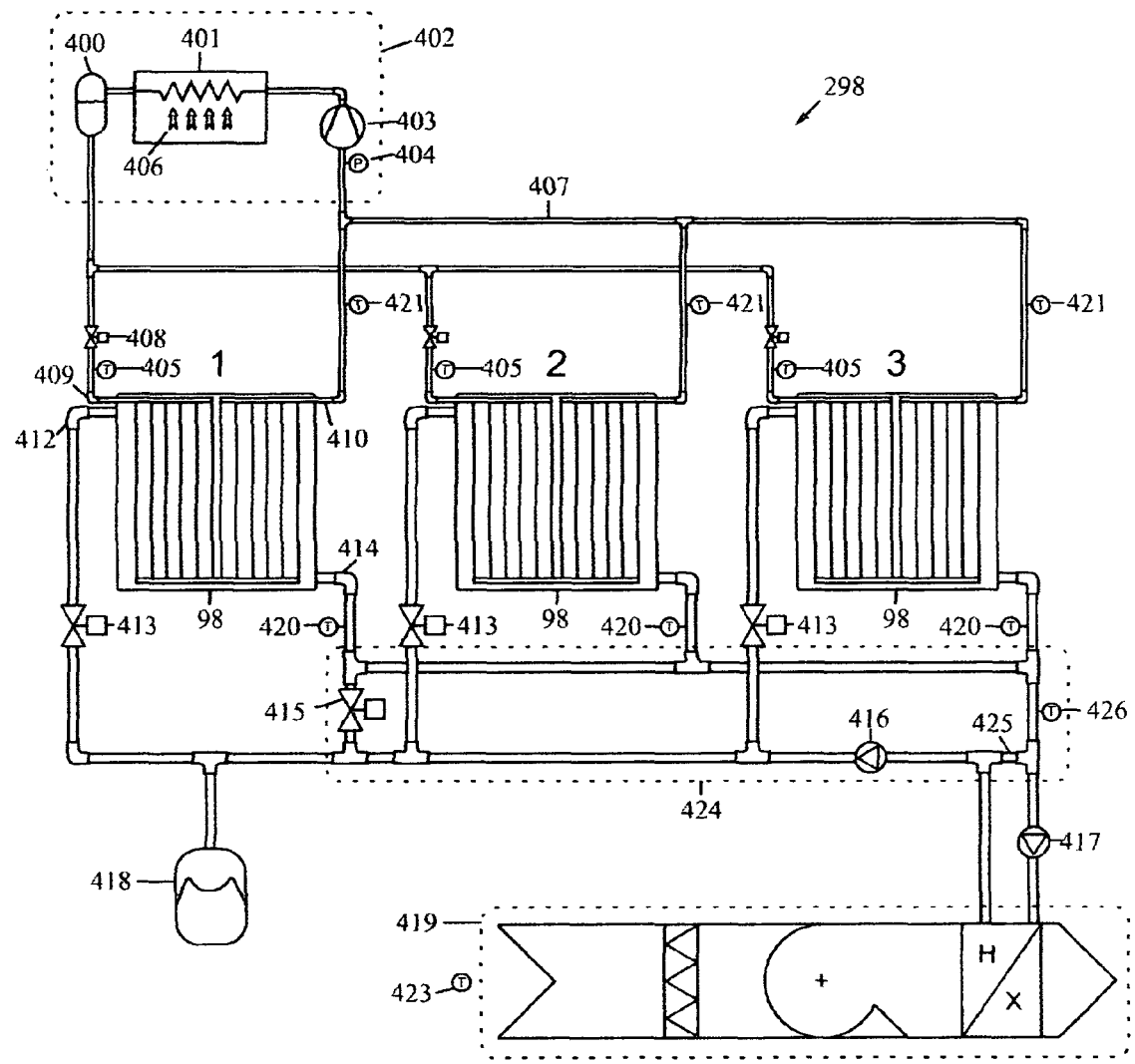
FIG. 4 is an illustration of an air conditioning system with energy storage using Thermal Energy Modules.

FIG. 4 is an illustration of an air conditioning system 298 with energy storage using Thermal Energy Modules 98. The system consists of a condensing unit 402 comprising of a compressor 403, condenser 401 which is cooled by an air stream 406, and refrigerant receiver 400. The condenser is connected to the heat exchangers of the Thermal Energy Modules 98 by tubing. Expansion devices 408 are installed on the supply side of the heat exchangers. In this embodiment of the invention Electrical Expansion Valves are used as expansion devices which have the ability to completely prevent refrigerant flow when closed. On the common outlet manifold 407 a pressure sensor 404 is installed. The refrigerant inlet and outlet temperatures on each Thermal Energy Module are measured respectively by temperature sensors 405 and 421. These temperature sensors are used by the control system to control the refrigerant's rate of flow to maintain superheat levels which prevent the liquid refrigerant from leaving the heat exchangers in the Thermal Energy Module units while keeping them as full of a liquid-vapor mixture as possible.

On the water side all Thermal Energy Modules are connected in parallel to the water loop 424 which includes a circulating pump 416 and a balancing valve 415. The supply pipe of the loop has a temperature sensor 426. Control valves 413 are installed on the inlet side 412 of the Thermal Energy Modules 98. The Thermal Energy Module outlets 414 have temperature sensors 420. The temperature sensors are used by the control system to regulate the control valves to put each Thermal Energy Module in one of the possible modes and control the temperatures to achieve the desired cooling effects. The heat exchanger of the air handling unit 419 is connected to the water loop through a bridge 425. A variable rate pump 417 removes the necessary quantity of heat from the air handling unit heat exchanger to cool the air and maintain the space temperature set point measured by the space temperature sensor 423. The removed heat is injected into the loop by pump 417. An expansion tank 418 creates a constant pressure in the entire hydronic system and compensates for thermal water expansion and contraction.

In this embodiment, all three Thermal Energy Modules 98 can work in the same ice accumulation mode or in different modes. For example, the first couple of Thermal Energy Modules may work in ice generating mode while the third Thermal Energy Module works in cooling mode. In this case, valves 413 on the first couple of Thermal Energy Modules are closed and the third Thermal Energy Module is open. Water propelled by pump 416 flows only through the third Thermal Energy Module. Initially the Electrical Expansion Valve 408 on the first couple of Thermal Energy Modules are closed and the Electrical Expansion Valve 408 on the third Thermal Energy Module controls refrigerant flow using superheat information from temperature sensors 405 and 421. Water washes over the heat exchanger transferring heat to the liquid refrigerant and evaporating it. Cooled water exits the third Thermal Energy Module and flows through water loop 424. When the temperature in the water loop 424 measured by temperature sensor 426 drops to the low set point, valve 408 on the third Thermal Energy Module is closed and valves 408 on the first two Thermal Energy Modules start controlling refrigerant flow to their heat exchangers using the superheat information from the pressure sensor 404 and temperature sensor 405 thereby starting or resuming ice formation. The first couple of Thermal Energy Modules may also work simultaneously or sequentially in ice formation mode. In the latter case valve 408 on the second Thermal Energy Module is closed until ice formation process is complete in the first Thermal Energy Module. This mode of operation will considerably decrease cycling of the compressor thus increasing its life span and efficiency of the system.

When a command to reduce electrical demand is received by the system but there is still a requirement for cooling, the compressor is turned off, and valves 408 are turned off on all Thermal Energy Module units. Valves 413 are modulated to control water flow thereby controlling the outlet temperature measured by the temperature sensors 420 and 426. The balancing valve 415 is controlled to maintain the water flow through the loop 424 constant.

Figure 5:
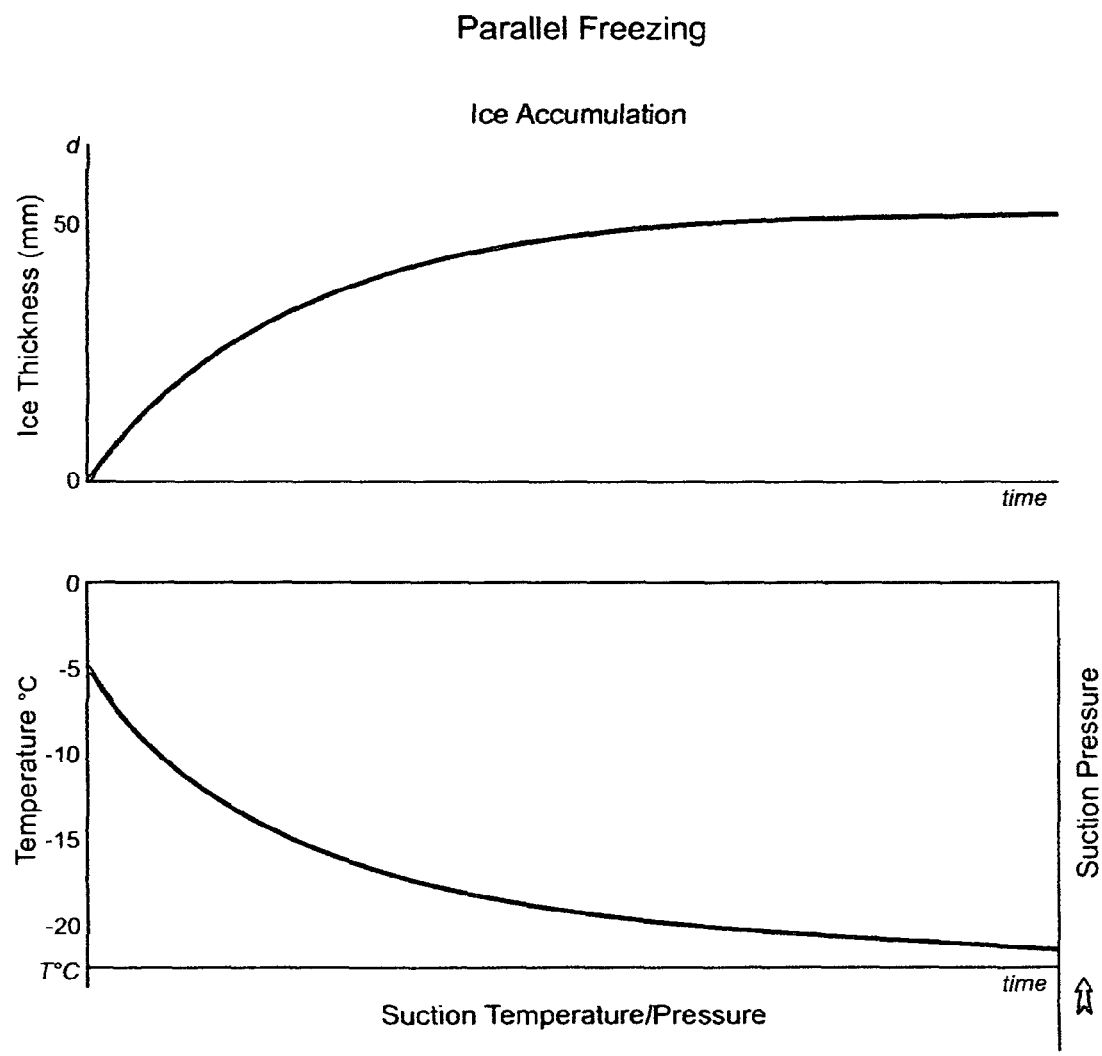
FIG. 5 is a graph of the changes in suction temperature and pressure at the exit of a TEM heat exchanger and ice thickness over time.

FIG. 5 is a graph of the changes in suction temperature and pressure at the exit of a TEM heat exchanger and ice thickness over time. In this embodiment, ice formation usually starts at temperatures of −5° C. for R410A refrigerant. The ice thickness starts growing very quickly which creates a thermal insulation layer on the heat exchanger surface. As the result, the heat transfer from the water in the tank to the refrigerant drops, the expansion valve closes reducing refrigerant flow and the saturation temperature and pressure drops accordingly. The drop in temperature of the heat exchanger assures further growth of the ice. The process of ice formation will stop only when the temperature drops to a level where the low pressure switch in the suction line is activated thereby turning off the compressor.

The ice thickness in the direction perpendicular to the planar surface of the heat exchanger at any particular moment (t) can be calculated if the historical data of temperatures of the surface $Tr(\tau)$ up to this moment is known. Then an integral can be calculated by the control system: $I(t)=\int Tr(\tau)^*d\tau$ where Tr is close to the refrigerant saturation temperature changing with time $\tau$. The integral is calculated in the process of ice grow from the moment $\tau=0$.

The thickness of the ice on one side of the heat exchanger can be calculated using the following formula: $d=\sqrt{(2*I(t)*K*Ui/\rho i/ci)}$ where Ui is thermal conductance of ice, $\rho i$ is density of ice, Ci is latent heat of ice, K is a correction coefficient associated with the type of the heat exchanger (derived experimentally)

Figure 6:
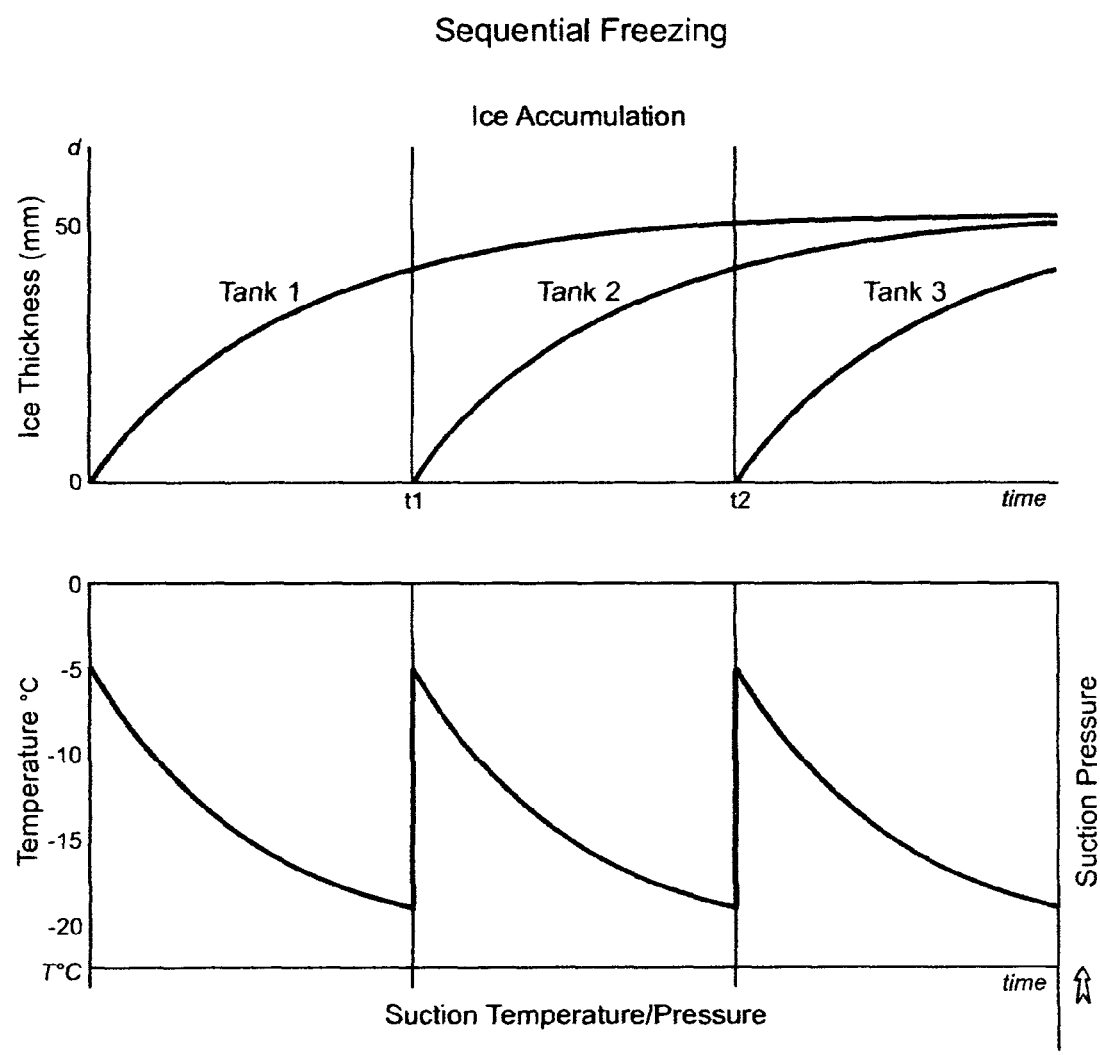
FIG. 6 is a graph of ice formation in multiple Thermal Energy Modules which are connected in parallel with respect to a refrigeration circuit through electrical expansion valves.

FIG. 6 is a graph of ice formation in multiple Thermal Energy Modules which are connected in parallel with respect to a refrigeration circuit through electrical expansion valves. The water flow to each Thermal Energy Module is shut off. At the start of the process Electrical Expansion Valves of the second and third Thermal Energy Modules are shut off and the Electrical Expansion Valve of the first Thermal Energy Module starts to modulate to maintain the superheat set point. The ice in the Thermal Energy Module starts growing, the thickness increases thereby increasing the thermal resistance and decreasing the saturation pressure and the temperature. When the suction pressure measured by the pressure sensor 204 drops to the set point, the Electrical Expansion Valve 208 of the second Thermal Energy Module starts modulating ice growth within the second Thermal Energy Module. The process continues, similar to what was described for the first Thermal Energy Module except for the fact that the process of ice growth continues when the second and third Thermal Energy Modules are staged on.

Figure 7:
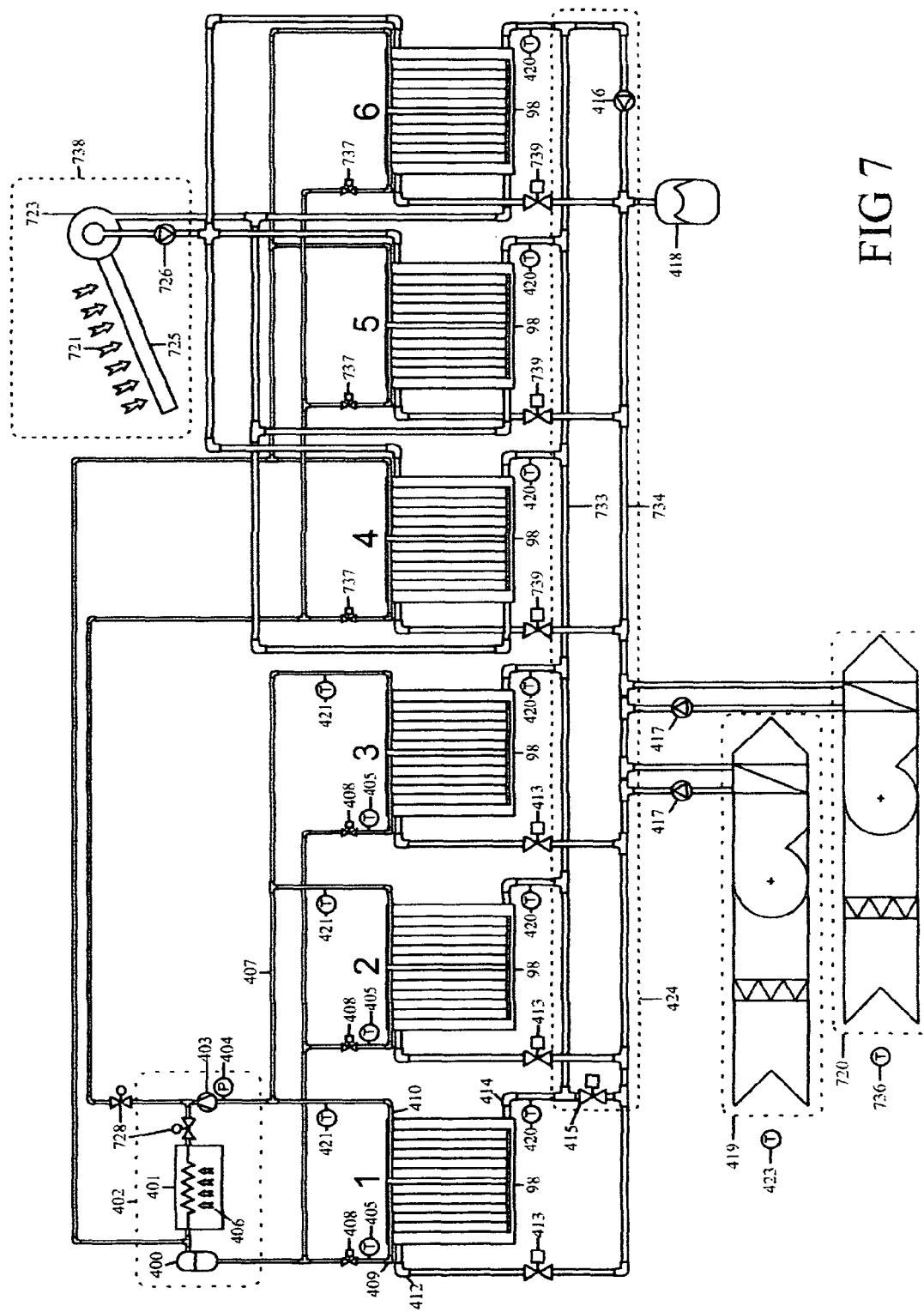
FIG. 7 is an illustration of a cooling and heating system which utilizes a plurality of Thermal Energy Modules, some for cooling and some heating applications.

FIG. 7 is an illustration of a cooling and heating system which utilizes a plurality of Thermal Energy Modules 98, some for cooling and some heating applications. The cooling portion of the system can operate similarly to the one described in FIG. 2. For heating, Thermal Energy Module heat exchangers are connected in parallel to the condenser 701 of the condenser block 702. The solenoid valves 728 facilitate the selection of the regular condenser 701 or the Thermal Energy Module heat exchangers for condensing the refrigerant hot gas exiting the compressor 703. However, both valves 728 can be opened to achieve additional sub cooling of the liquid refrigerant for increasing the efficiency and capacity of the cooling system.

Each Thermal Energy Module heat exchanger has a solenoid valve which allows controlling the condensing capacity by connecting from 1 to 3 Thermal Energy Modules in the refrigeration circuit. One hydronic circuit of the heating TEM units is connected to the thermal solar system 738. This system consists of a vacuum tube or plate type solar collector 725, hydronic manifold 723, and a circulating pump 726. When the pump 726 is on, the water (or other heat transferring liquid) circulates through the Thermal Energy Modules heating the volume of water to the temperature generated by the solar system. If the temperature in the Thermal Energy Module tanks reaches the design temperature (which can be up to 100° C. or higher) or if the temperature in the tanks exceeds the temperature generated by the solar system, the pump is turned off.

Refrigeration and solar heating can work sequentially, for example, refrigerant heating can work during night time when the cooling system is in ice generating mode, effectively moving energy from the first three Thermal Energy Modules to the last three Thermal Energy Modules. In this mode the temperature in the last three Thermal Energy Modules can reach 40° C. or higher. These temperatures are adequate for low temperature heating, for example, radiant floors.

The other hydronic circuit of the heating TEM units is connected to the main water loop 732 through the heating control valves. If cooling control valves 713 are closed and one or more heating control valves 739 are regulating the system, then it is in heating mode. Hot water is circulated in the main loop by the main circulating pump 716. The local circulating pumps 717 extract heat from the loop, circulating water through the coils of the air conditioning units 719 and 720. During the winter time when cooling is not required and the solar heating system is capable of generating high temperatures, all Thermal Energy Modules can be switched to heating mode. In this mode the condensing unit 702 is turned off, control valves 713 and 739 are open and the pump 716 circulates water through the main loop of all the Thermal Energy Modules, effectively transferring thermal energy from units the last three Thermal Energy Modules to units to the first three. During a sunny winter day the system may store enough thermal energy in this mode to heat the building during the night time.

Figure 8:
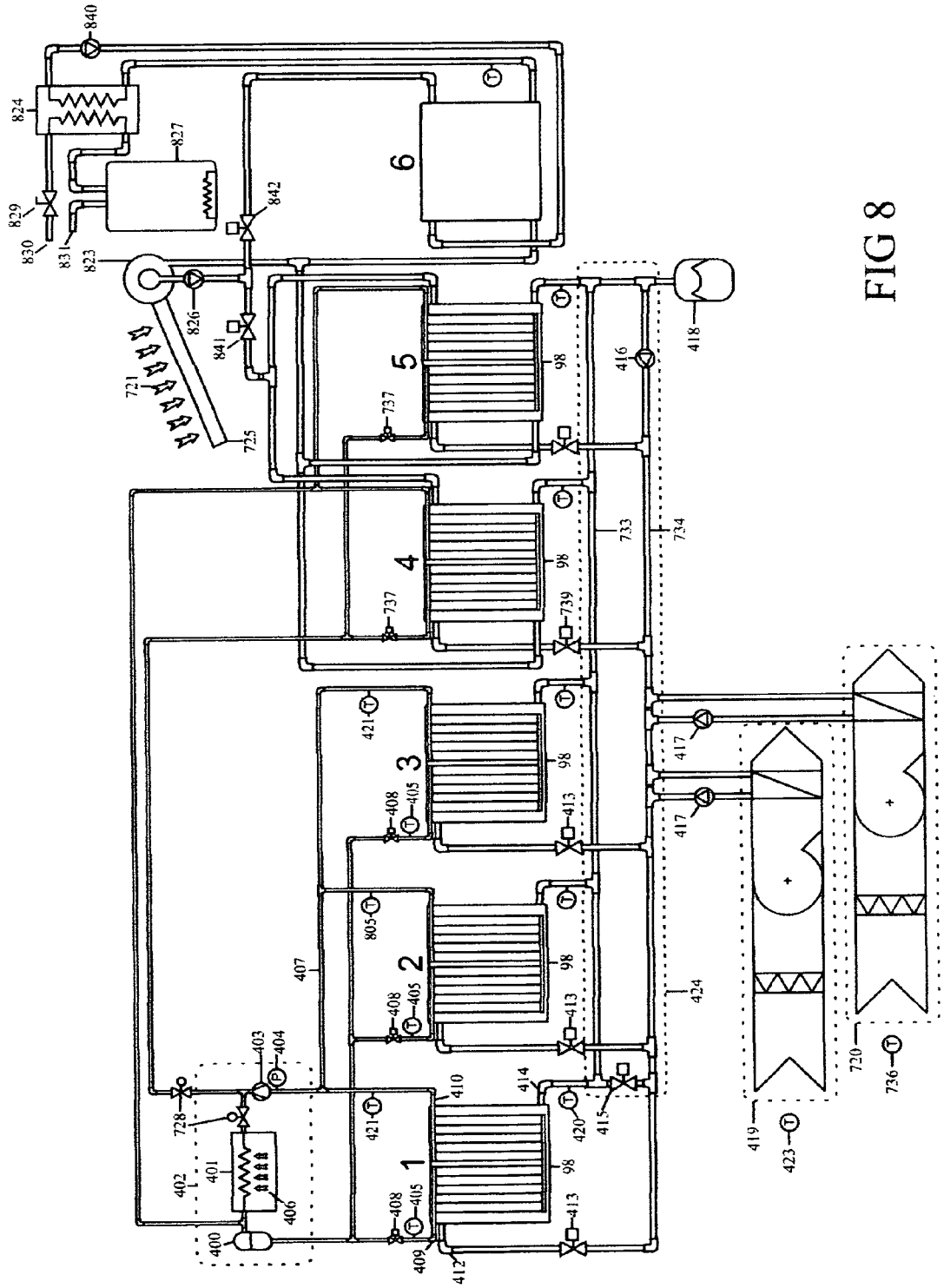
FIG. 8 is an illustration of a Thermal Energy Module utilized for thermal energy storage in domestic hot water heating.

FIG. 8 is an illustration of a Thermal Energy Module utilized for thermal energy storage in domestic hot water heating. The system has valves 841 and 842 installed on the solar heating loop. These valves can direct hot water from the solar panel 825 to Thermal Energy Modules for space heating or to the sixth Thermal Energy Module for domestic hot water system. The domestic hot water pump circulates water through the sixth Thermal Energy Module and the heat exchanger 824 preheating from the cold water main 830 before it feeds into the water heater 827. Hot water from the water heater 827 then flows to the domestic hot water distribution system 831. The sixth Thermal Energy Module can be installed without a refrigerant heat exchanger.

FIG. 9 is an illustration of the application of a Thermal Energy Module within the wall framing of a building. In this case the Thermal Energy Modules also serve as thermal insulation for the building. All the voids between the Thermal Energy Modules should be filled with standard insulation.

Figure 10:
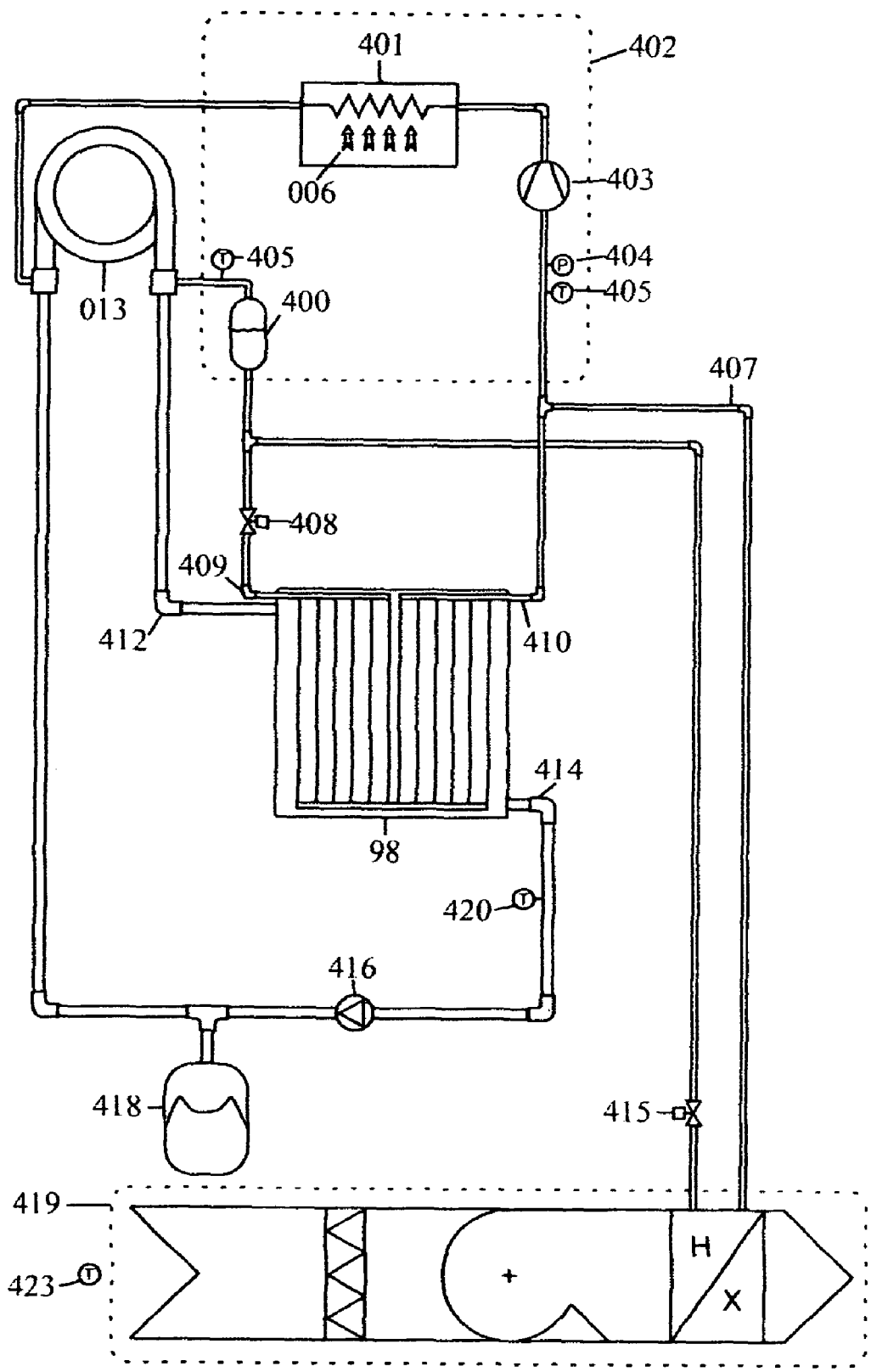
FIG. 10 is an illustration of a Direct Expansion system utilizing Thermal Energy Module ice storage and a water source heat exchanger.

FIG. 10 is an illustration of a Direct Expansion system utilizing Thermal Energy Module ice storage and a water source heat exchanger. Also this system has two Electrical Expansion Valves 008 and 015 which direct and control liquid refrigerant from the receiver 017 to the Thermal Energy Module evaporator or the heat exchanger of the AC unit 019. The water loop transfers heat from water cooled condenser 013 to the TEM by a water pump 016. The expansion tank 018 maintains constant pressure in the water loop.

During normal operation the water pump 016 is off and all the condensing of the refrigerant exiting the compressor 003 is performed by the air cooled condenser 001. Liquid refrigerant from the condenser 001 moves through the heat exchanger and into the receiver 017. When the thermostat 023 calls for cooling the Electrical Expansion Valve 015 opens and starts controlling the refrigerant flow to maintain the superheat set point in the AC heat exchanger. When the thermostat 023 is satisfied, refrigerant flow through the AC heat exchanger is stopped by the Electrical Expansion Valve 015 and another Electrical Expansion Valve 008 opens and starts controlling the flow through the Thermal Energy Module evaporator. The ice production then begins or continues. This process of alternating space cooling and ice production can persist until the Thermal Energy Module(s) is completely charged or the demand reduction request is received.

In demand reduction mode, pump 016 starts and varies the rate of flow to control the heat exchanger outlet temperature at set point. The Electrical Expansion Valve 008 is shut down. The high temperature refrigerant exiting the compressor 013 passes through the main condenser desuperheating but without condensation. Condensation occurs in the water source condenser 013. On a hot summer day the condensation temperature after the water source heat exchange can be as low as 10-15° C. in comparison with 50-55° C. after the air source condenser. Respective refrigeration cycle efficiency can be increased fivefold. The energy consumption will also reduce respectively.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

We claim:

1. A Thermal Energy Module, comprising:
a heat exchanger for the direct expansion of refrigerant in fluidic communication with an external compressor and further in fluidic communication with an external expansion device, wherein the heat exchanger comprises a refrigerant inlet manifold and an refrigerant outlet manifold, and a first heat transfer structure disposed between the refrigerant inlet manifold and the refrigerant outlet manifold to allow fluidic communication between the refrigerant inlet manifold and the refrigerant outlet manifold wherein said first heat transfer structure comprises a substantially flat first heat transfer surface, a substantially flat second heat transfer surface, a first vertical edge, and a second vertical edge; and
a tank containing a heat transfer medium and the heat exchanger, the tank comprising a top, a bottom, a first face side, a second face side, a first edge side, a second edge side, a heat transfer medium inlet in hydraulic communication with an external heat load, and a heat transfer medium outlet in hydraulic communication with the external heat load, wherein the heat exchanger is disposed within the tank so that the first heat transfer surface is substantially parallel to the first face side creating a first space of heat transfer medium and further creating a second space of heat transfer medium between the first vertical edge and the first edge side, wherein the tank is adapted to allow liquid refrigerant provided from the external expansion device to enter the refrigerant inlet manifold and vapor refrigerant to exit the refrigerant outlet manifold to the external compressor;
wherein the heat transfer medium inlet further comprises a nozzle arrangement for creating submerged jets of heat transfer medium directed from the first edge side to the first vertical edge, the nozzle arrangement including a plurality of nozzles located along a line extending adjacent to and substantially parallel to the first edge side;
wherein the refrigerant inlet manifold accepts liquid refrigerant from the external expansion device, the first heat transfer structure evaporates the liquid refrigerant producing vapor refrigerant, and the resulting vapor refrigerant is removed via the refrigerant outlet manifold, thereby exchanging latent heat between the first heat transfer surface and the heat transfer medium; and
further wherein the tank is adapted to form a first pocket of liquid heat transfer medium in the second space of heat transfer medium when ice forms in the first space of heat transfer medium.

2. The Thermal Energy Module of claim 1, wherein the heat exchanger further comprises a heat exchanger top and a heat exchanger bottom and the refrigerant inlet manifold is disposed on the heat exchanger bottom and the refrigerant outlet manifold is disposed on the heat exchanger top.

3. The Thermal Energy Module of claim 1, wherein the heat exchanger further comprises a second heat transfer structure and a pass-through manifold and the first heat transfer structure is disposed between the refrigerant inlet manifold and the pass-through manifold and the second heat transfer structure is disposed between the pass-through manifold and the refrigerant outlet manifold.

4. The Thermal Energy Module of claim 1, wherein the heat transfer medium comprises water.

5. The Thermal Energy Module of claim 1, wherein the nozzle arrangement is disposed within the tank so that the nozzle rests within the first pocket of liquid heat transfer medium even when ice has formed within the first space.

6. The Thermal Energy Module of claim 1, wherein the submerged jets are adapted to prevent the freezing of the heat transfer medium in the first space.

7. The Thermal Energy Module of claim 1, wherein the first heat transfer structure comprises microchannel tubing.

8. The Thermal Energy Module of claim 1, wherein the tank is adapted to be placed within the wall of a building.

9. A Thermal Energy System, comprising:
a first Thermal Energy Module; and
a second Thermal Energy Module,
the first Thermal Energy Module and the second Thermal Energy Module each having a heat exchanger for the direct expansion of refrigerant in fluidic communication with an external compressor and further in fluidic communication with an external expansion device, wherein the heat exchanger comprises a refrigerant inlet manifold and a refrigerant outlet manifold, and a first heat transfer structure disposed between the refrigerant inlet manifold and the refrigerant outlet manifold to allow fluidic communication between the refrigerant inlet manifold and the refrigerant outlet manifold wherein said first heat transfer structure comprises a substantially flat first heat transfer surface, a substantially flat second heat transfer surface, a first vertical edge, and a second vertical edge, and a tank containing a heat transfer medium and the heat exchanger, the tank comprising a top, a bottom, a first face side, a second face side, a first edge side, a second edge side, a heat transfer medium inlet in hydraulic communication with an external heat load, and a heat transfer medium outlet in hydraulic communication with the external heat load, wherein the heat exchanger is disposed within the tank so that the first heat transfer surface is substantially parallel to the first face side creating a first space of heat transfer medium and further creating a second space of heat transfer medium between the first vertical edge and the first edge side, wherein the tank is adapted to allow liquid refrigerant provided from the external expansion device to enter the refrigerant inlet manifold and vapor refrigerant to exit the refrigerant outlet manifold to the external compressor, wherein the heat transfer medium inlet further comprises a nozzle arrangement for creating submerged jets of heat transfer medium directed from the first edge side to the first vertical edge, the nozzle arrangement including a plurality of nozzles located along a line extending adjacent to and substantially parallel to the first edge side;
wherein the refrigerant inlet manifold accepts liquid refrigerant from the external expansion device, the first heat transfer structure evaporates the liquid refrigerant producing vapor refrigerant, and the resulting vapor refrigerant is removed via the refrigerant outlet manifold, thereby exchanging latent heat between the first heat transfer surface and the heat transfer medium, and wherein the tank is adapted to form a first pocket of liquid heat transfer medium in the second space of heat transfer medium when ice forms in the first space of heat transfer medium;
wherein the refrigerant inlet manifold of the first Thermal Energy Module is in fluidic communication with the refrigerant inlet manifold of the second Thermal Energy Module and the refrigerant outlet manifold of the first Thermal Energy Module is in fluidic communication with the refrigerant outlet manifold of the second Thermal Energy Module.

10. A Thermal Energy Module, comprising:
a heat exchanger for the direct condensation of refrigerant wherein the heat exchanger comprises a refrigerant inlet manifold and a refrigerant outlet manifold and a first heat transfer structure disposed between the refrigerant inlet manifold and the refrigerant outlet manifold to allow fluidic communication between the refrigerant inlet manifold and the refrigerant outlet manifold wherein said first heat transfer structure comprises a substantially flat first heat transfer surface, a substantially flat second heat transfer surface, a first vertical edge, and a second vertical edge; and
a tank containing a heat transfer medium and the heat exchanger, the tank comprising a top, a bottom, a first face side, a second face side, a first edge side, a second edge side, a heat transfer medium inlet in hydraulic communication with an external heat load, and a heat transfer medium outlet in hydraulic communication with the external heat load, wherein the heat exchanger is disposed within the tank so that the first heat transfer surface is substantially parallel to the first face side creating a first space of heat transfer medium and further creating a second space of heat transfer medium between the first vertical edge and the first edge side, wherein the tank is adapted to allow vapor refrigerant provided from an external refrigerant source to enter the refrigerant inlet manifold and liquid refrigerant to exit the refrigerant outlet manifold to the external refrigerant source;
wherein the heat transfer medium inlet further comprises a nozzle arrangement for creating submerged jets of heat transfer medium directed from the first edge side to the first vertical edge, the nozzle arrangement including a plurality of nozzles located along a line extending adjacent to and substantially parallel to the first edge side;
wherein the refrigerant inlet manifold accepts vapor refrigerant from the external refrigerant source, the first heat transfer structure condenses the vapor refrigerant producing liquid refrigerant, and the resulting liquid refrigerant is removed via the refrigerant outlet manifold, thereby exchanging latent heat between the first heat transfer surface and the heat transfer medium.

11. A Heating and Cooling system, comprising:
a first thermal energy module having a first heat exchanger for the direct expansion of refrigerant wherein the first heat exchanger comprises a first refrigerant inlet manifold in fluidic communication with an external expansion device which is, in turn, in fluidic communication with a refrigerant receiver and a first refrigerant outlet manifold in fluidic communication with a suction port of an external compressor, and a first heat transfer structure disposed between the first refrigerant inlet manifold and the first refrigerant outlet manifold to allow fluidic communication between the first refrigerant inlet manifold and the first refrigerant outlet manifold wherein said first heat transfer structure comprises a substantially flat first heat transfer surface, a first vertical edge, and the first thermal energy module comprises a first tank containing a first heat transfer medium and the first heat exchanger, the first tank comprising a first top, a first bottom, a first face side, a first edge side, a first heat transfer medium inlet in hydraulic communication with a first external heat exchange coil via a first water loop circulated by a first water pump, and a first heat transfer medium outlet in hydraulic communication with the first external heat exchange coil, wherein the first heat exchanger is disposed within the first tank so that the first heat transfer surface is substantially parallel to the first face side creating a first space of heat transfer medium and further creating a second space of heat transfer medium between the first vertical edge and the first edge side, wherein the first tank is adapted to allow liquid refrigerant provided from the external expansion device to enter the first refrigerant inlet manifold and vapor refrigerant to exit the first refrigerant outlet manifold to the external compressor, wherein the first heat transfer medium inlet further comprises a nozzle for creating a submerged jet of heat transfer medium directed from the first edge side to the first vertical edge, wherein the first refrigerant inlet manifold accepts liquid refrigerant from the external expansion device, the first heat transfer structure evaporates the liquid refrigerant producing vapor refrigerant, and the resulting vapor refrigerant is removed via the first refrigerant outlet manifold, thereby exchanging latent heat between the first heat transfer surface and the first heat transfer medium, and further wherein the first tank is adapted to form a first pocket of liquid heat transfer medium in the second space of heat transfer medium when ice forms in the first space of heat transfer medium; and
a second thermal energy module having a second heat exchanger for the direct condensation of refrigerant wherein the second heat exchanger comprises a second refrigerant inlet manifold in fluidic communication with a high pressure port of the external compressor and a second refrigerant outlet manifold in fluidic communication with the refrigerant receiver and a second heat transfer structure disposed between the second refrigerant inlet manifold and the second refrigerant outlet manifold to allow fluidic communication between the second refrigerant inlet manifold and the second refrigerant outlet manifold wherein said second heat transfer structure comprises a substantially flat second heat transfer surface, a second vertical edge, and the second thermal energy module further comprises a second tank containing a second heat transfer medium and the second heat exchanger, the second tank comprising a second top, a second bottom, a second face side, a second edge side, a second heat transfer medium inlet in hydraulic communication with a second heat exchange coil via a second water loop circulated by a second water pump, and a second heat transfer medium outlet in hydraulic communication with the second heat exchange coil, wherein the second heat exchanger is disposed within the second tank so that the second heat transfer surface is substantially parallel to the second face side creating a third space of heat transfer medium, wherein the second tank is adapted to allow vapor refrigerant to enter the second refrigerant inlet manifold and liquid refrigerant to exit the second refrigerant outlet manifold, wherein the second refrigerant inlet manifold accepts vapor refrigerant, the second heat transfer structure condenses the vapor refrigerant producing liquid refrigerant, and the resulting liquid refrigerant is removed via the second refrigerant outlet manifold, thereby exchanging latent heat between the second heat transfer surface and the second transfer medium;
wherein the heating and cooling system is adapted to evaporate refrigerant in the first thermal energy module thereby chilling or freezing the first heat transfer medium and condensing the refrigerant in the second thermal energy module thereby heating the second heat transfer medium.

* * * * *